United States Patent [19]
Feuerherm

[11] Patent Number: 5,256,346
[45] Date of Patent: * Oct. 26, 1993

[54] METHOD OF EXTRUSION BLOW-MOLDING HOLLOW THERMOPLASTIC BODIES

[76] Inventor: Harald Feuerherm, Alfred-Delp-Strasse 1, D-5210 Troisdorf, Fed. Rep. of Germany

[*] Notice: The portion of the term of this patent subsequent to Apr. 7, 2009 has been disclaimed.

[21] Appl. No.: 864,285

[22] Filed: Apr. 6, 1992

Related U.S. Application Data

[63] Continuation-in-part of Ser. No. 701,650, May 15, 1991, Pat. No. 5,102,588, which is a continuation of Ser. No. 348,443, May 8, 1989, abandoned.

[30] Foreign Application Priority Data

May 12, 1988 [DE] Fed. Rep. of Germany ....... 3816273

[51] Int. Cl.$^5$ .................... B29C 49/04; B29C 49/78
[52] U.S. Cl. .................... 264/40.4; 264/40.7; 264/541; 425/140; 425/148
[58] Field of Search ............. 264/40.4, 40.5, 536, 264/541, 40.1, 40.2, 40.3, 40.7; 425/140, 148

[56] References Cited

U.S. PATENT DOCUMENTS

| 3,629,382 | 12/1971 | Fogelberg et al. | 264/541 |
| 3,795,719 | 3/1974 | Morecroft et al. | 264/541 |
| 4,179,251 | 12/1979 | Hess et al. | 425/140 |
| 4,338,071 | 7/1982 | Daubenbüchel et al. | 264/40.4 |
| 4,382,761 | 5/1983 | Daubenbüchel et al. | 264/40.4 |
| 4,444,702 | 4/1984 | Thomas et al. | 264/40.1 |
| 4,869,862 | 9/1989 | Bryan | 264/40.1 |
| 5,102,588 | 4/1992 | Feuerherm | 264/40.4 |

FOREIGN PATENT DOCUMENTS

| 6028830 | 3/1981 | Japan | 264/40.5 |
| 8402874 | 8/1984 | PCT Int'l Appl. | 264/40.1 |

Primary Examiner—Catherine Timm
Attorney, Agent, or Firm—Herbert Dubno

[57] ABSTRACT

Tubular bodies are extruded from thermoplastic material by forming a tubular preform at an exit of an extruder head die after which the tubular preform is then blown to the configuration of a cavity of a blow mold. The position of the preform relative to the blow mold is regulated and/or controlled, and waste portions produced in the blow mold are separated from the blown hollow body. The weight of the separated lower waste portions and/or the net weight of the hollow body when in accumulation head operation is measured in order to control and/or regulate the position of the preform and to change the die slit in the event of a weight deviation from a reference value. With respect to continuous extruder operation of an extruder head, either the hollow body net weight and the weight of the lower waste portions are measured and compared with reference values or the positions of markings relative to particularly critical cross-sectional zones are compared with present reference values to derive appropriate position control and/or regulation of the preform.

13 Claims, 7 Drawing Sheets

METHOD OF EXTRUSION BLOW-MOLDING HOLLOW THERMOPLASTIC BODIES

CROSS-REFERENCE TO RELATED APPLICATION

This application is a continuation-in-part application of application Ser. No. 07/701,650 filed on May 15, 1991 and now U.S. Pat. No. 5,102,588, which is a Rule 62 continuation of Ser. No. 07/348,443 filed May 8, 1989, now abandoned.

BACKGROUND OF THE INVENTION

The invention concerns a method for extrusion blow-molding a hollow body from a thermoplastic material.

To manufacture hollow thermoplastic bodies, for instance cans or other containers, essentially two kinds of machines are used in practice. One type employs a continuously activated extruder followed by an extruder head from which tubular pre-molded articles exit at the lower end. The other type of machine uses an accumulator head. By means of a thermoplastic material plunger, the thermoplastic or plastic material in the accumulator space is pressed out into a tubular preformed article or item. Accordingly, this pressing takes place discontinuously. Because the hollow bodies may assume the most diverse shapes, and where furthermore the pertinent wall zones may be subjected in practice to especially high mechanical stresses, a wall-thickness program is set up over the length of the particular preformed items. Presently the wall-thickness programming is carried out using conventional control means. Equipment is available for programming the wall thickness in the longitudinal direction and furthermore to control the wall thickness over the periphery of the preformed item. Illustratively the transmission cross-section in the extruder head or in the accumulator head is varied over the entire periphery or only in places, whereby a preformed item is obtained, which effects variable wall thicknesses over its length and possibly also in parts of its periphery.

It is understood at the present time that it is important to secure a reliable wall-thickness distribution of the preformed item. This is important when besides the wall-thickness distribution in the longitudinal direction the preformed item also shall have a variable wall-thickness distribution over its periphery. This is the case illustratively when manufacturing bottles or cans. In such cases the programmed points which, following the stretching of a preformed item into a can in the blowing mold, are located in the narrow zones between the upper wall and the lower wall on one hand and the sidewalls on the other hand, are provided with extremely large wall thickness because the wall-thickness program for the radial wall-thickness control allows shifting this excess of material into the areas of more substantial stretching. These extreme points in the preset program can be stretched only when using simultaneously a partial or radial wall-thickness control, because in that case this material also can be shifted in the peripheral direction and no material accumulations may take place in undesired places, for instance near the mold parting lines. The more extremely the program curve must be stretched in particular zones or in relation to particular program points, the more precisely too the material pertinent to those points and subjected to the largest stresses must be present at the proper site in the blow mold. Deviations of more than ±1% relative to the height of the blow molded item/body entail significant degradation in quality. Illustratively, warping takes place in the hollow body and substantially lower strain resistance and other degradations in strength are incurred in the finished hollow body.

In addition, about 50% of the manufacturing costs are material costs. The materials paid for by the customer are becoming fewer, and they may not degrade the mechanical properties. Already on grounds of product liability, quality control of the hollow bodies will be mandatory. High quantitative output with reasonable warping is required and assured by keeping constant previously determined wall thicknesses. As a rule poorer mechanical property values cannot be accepted as tradeoffs, and therefore the input weight must be increased and thereby more warping of the hollow body or a lowering in output occurs.

In practice a number of requirements are placed on the hollow body. The table at the end lists on one hand such criteria and on the other the main steps affecting this criteria. The abbreviations used in the table mean the following: PWTC=partial (radial) wall thickness control; SFDR=static, flexible, deforming ring.

To optimize a hollow body in the light of the criteria of this table, in particular to achieve good mechanical properties, and, depending on the difficulties raised by the hollow body, an expert will need from one to five days set-up time at the blow-molding machine. Optimal values then can be achieved only for extreme wall thickness program curve peaks.

The interfering factors can be listed as six different groups and entail the following defects:

(a) Varying extruder output and therefore variable lengths of the preformed items; as a consequence, while the net weight of the hollow body stays constant, the critical points or the critical cross-sectional zones will be displaced within the blow mold.

(b) Varying swelling of the preformed item and thereby variable length of this preformed item; as a consequence, the net weight of the hollow body varies, and the critical points, or the critical cross-sectional zones are displaced.

(c) A varying lower edge at the preformed item in spite of a constant hollow body net weight and a length of the preformed item regulated to be constant at the measurement point results in the absence of a constant gross or preformed weight; as a result, while the hollow body net weight is constant, the critical points, or the cross-sectional zones, are displaced.

(d) In spite of constant weight and length of the preformed item, a varying molding time causes a displacement of the wall-thickness distribution toward the blow mold because of varying shrinkage and/or sagging.

(e) Varying tendency to stretching caused by different plastics, that is different viscosities, temperatures etc. enhances the defects in final stretching for extremely peaked wall-thickness points.

(f) Excessively lengthy compensation of a defect, most of all when starting the machine and when converting to other weights, materials, molds and sizes of hollow bodies etc. entails excessive production shutdown.

The expression "tendency to stretching" means the following behavior of the material. It is constantly found in practice that the material will elongate differently. The main causes are variable distributions in viscosity, different temperatures, different wall thicknesses in the preformed item up to the notch effect and different orientation of the plastic molecule inside the plastic material, even if during the production of the plastic and during further treatment every technical means is employed to arrive at as homogeneous a material as possible.

In order to properly assess the pertinent state of the art discussed below, the possible defects listed above must be taken into account.

The periodical MASCHINENMARKT 1973, vol. 7, pp 118-20 discloses keeping the length of the preformed item as uniform as possible by adjusting the width of the extruder/die slit. Using an accumulator head, the volume of the preformed item is kept constant by means of preset accumulation stroke. If now furthermore the temperature, the output rate and the pressure on the plastic material remain constant, then the gross weight of the produced hollow body shall also be constant. Because of the main interfering factors elucidated below, the lengths of the preformed items will vary and attempts will be made to compensate for these variable lengths by a device seizing the lower edges of the preformed items and subsequently regulating the extruder slit. The goal is always to use the length of the preformed item to move the wall thickness programming preset cavity for the preformed item into the right position relative to the blow mold. However, this cannot be achieved because of defects (c) through (e) earlier mentioned. The operator/expert obliterates the set, optimal wall thickness program, or in plainer words, any peaks in the program curve are rounded off. As a result, differences in wall thickness arise and thereby degraded mechanical properties and warping of the hollow bodies, and most of the time including excessive input weight.

The European Offenlegungsschrift 84 90 0506 discloses a method for regulating the wall thickness of thermoplastic tubular preformed items, the position of these preformed items relative to the blow mold being monitored by a pickup (preferably a photocell) whereupon the preformed items are each widened in a blow mold by means of the inside pressure and lastly the position of each preformed item relative to the blow mold is controlled in relation to at least one predetermined cross-sectional zone of the preformed item. This document further discloses marking in one or more places this preformed item upon expiration of the wall thickness program, where said marking(s) following sensing by the pickup permit the introduction of suitable control steps. However, it is impossible to simultaneously keep the net weight of the hollow body constant or to regulate it.

Apparatus is also known from the German Offenlegungsschrift 29 40 418 to control the weight of a hollow body made by blow extrusion and consisting of a thermoplastic wherein the hollow body weight is determined after it leaves the blow mold and compared to a reference value and wherein, depending on the result of this comparison, the slit width of the discharge is made adjustable to regulate the volume of the material forming the preformed item. Also, a device sensing the length of the preformed item is present which emits a signal to control the motion of the blow-molded parts or of the blow mold. Lastly, control means is included to keep as constant as possible the time within which a preformed item is formed. In this instance an attempt is made for the programmed wall thickness distribution on the preformed item to always assume the proper position relative to the blow mold.

The following documents also are part of the pertinent state of the art, namely U.S. Pat. No. 4,474,716 and the European patent document A 80 10 4933. The apparatus disclosed in these documents is capable within its design limits of compensating fluctuations during production by varying extruder output and by variable swelling of the preformed item as regards long-term. In practice, however, it was found impossible to move the critical points of the wall thickness program and hence the critical cross-sectional zones into the proper position relative to the blow mold. The reasons for this failure are the following: An attempt is made to keep the net weight constant, but this is impossible for a fixed position of the preformed item with the right length if there is a different lower edge in the preformed item (defect (c)). Even when the pickup is located most advantageously at the middle between a concave or a convex lower edge, the required average of the length of the preformed item cannot be achieved, though it is required to keep the preformed item weight constant. In addition to this different edge shape at the lower end of the preformed item, there are also further sources of defects, for instance a less than clean cut, machine vibrations, and oblique tube production in an irregular manner. Because of these defects, the wall thickness points are shifted at or along the hollow body.

Furthermore, the time between sensing the length of the preformed item and the fixation of the preformed item by the blow mold is not constant, that is, there is no constant mold dwell time (defect d)). Also, because of the time-difference T2-TI defect (d) is incurred and thereby, also for a running machine, shifts of the wall thickness points toward the blow mold because of shrinkage and/or sagging.

It must moreover be kept in mind that the preformed item when being widened has a variable tendency to stretch because of differences in viscosity and in material temperature, as a result of which differential stretching of the critical points or critical cross-sectional zones takes place. When using the required partial wall-thickness control, these shifts increase further defect (e), as will be explained in relation to FIG. 7.

Also, the optimization during machine adjustment, which can only be carried out by an expert/specialist, and the levelling procedure, especially in the start-up phase, take much too long in conventional equipment because the superposition of three control loops renders this equipment suitable only for stabilizing production. When starting up, especially on Monday mornings, and until the temperature matches that of the components adjoining the flow duct, or if there are movements of the blow mold, etc., substantial deviations from the reference values will be incurred.

Further deviations will be incurred by changes during the optimization stage and when converting to other materials, weights, sizes of hollow bodies, etc. (defect (f)).

It is also known from the periodical KUNSTSTOFF-BERATER 2/1977, pp. 78 through 81 and 87, further 6/1978, pp. 310 through 314 and 319, 320, and also from the Technical Report of the INSTITUT FUER KUNSTSTOFFVERARBEITUNG of the Aachen "Technische Hochschule" by S. Dormeyer, PhD, namely "On Automating Blow-Extrusion" to define the waste-portion length or the waste-portion weight as the measure of the length of the preformed item. The point in this essentially is to achieve a minimum waste-portion length and it is suggested to that end to control both the rate of extrusion and the angular screw speed besides the length of the preformed item. It is suggested in addition to employ a continuous measurement method for the waste-portion length in lieu of the known light sensors located underneath the blow mold. Also, the waste-portion length or the waste-portion weight is considered being a measure of the optimal processing length. In every case the object is to achieve constant waste-portion length and also a constant length of the preformed item. However, such control is by means of light sensors which also serve to measure the rate of extrusion.

The periodical KUNSTSTOFFE 70 (1980), 9, pp. 522 through 524 discloses a device for controlling the weight of blown items or parts. This device operates in such a manner that blown parts made by the blow mold first arrive at a density testing station. The blown parts recognized as being defect-free pass on to a digital weighing scale to sense the blown part weights for weight control purposes. The control loop for the weights in addition to said scale also includes a microprocessor controlled unit and motor potentiometer for automatically adjusting the slit in the wall thickness program as the adjusting means. The scale also includes a photocell that releases the weight value to the computer.

The German Offenlegungsschrift 31 14 371 also is part of the relevant state of the prior art. It clearly instructs the expert of the existing practical difficulties. Return forces in or sagging of the preformed item additionally hamper the association of the wall thickness program with the blow mold. Therefore, in light of the particular operational state and the materials data, a relation is obtained between the measured exit length and an effective length of the preformed item, and this is fed into a comparator. This additional information/input achieves a more accurate association of the wall thickness program on the preformed item relative to the blow mold. But additional drawbacks are incurred, namely, no control of the net weight of the hollow body will ensure. Moreover defects (c) through (e) will arise.

The sources causing defects when controlled by means of the lower edge of the preformed item therefore are essentially the following, both as regards continuous extrusion and accumulator head operation: a messy cut or uneven separation of the preformed item underneath the head, variable support air and support air pressure, machine vibrations, oblique tube runs, back deformation or shrinkage, and because of weight, tube sagging at different times between finishing the preformed item and closing of the blow mold and pre-extrusion in accumulator head operation.

SUMMARY OF THE INVENTION

Accordingly, it is an object of the present invention to provide a method whereby on one hand the proper position of the preformed item is secured relative to the blow mold at its critical cross-sectional zones, and on the other hand the proper weight of the molded hollow body is assured.

With the above, and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENTS

Figure 1:
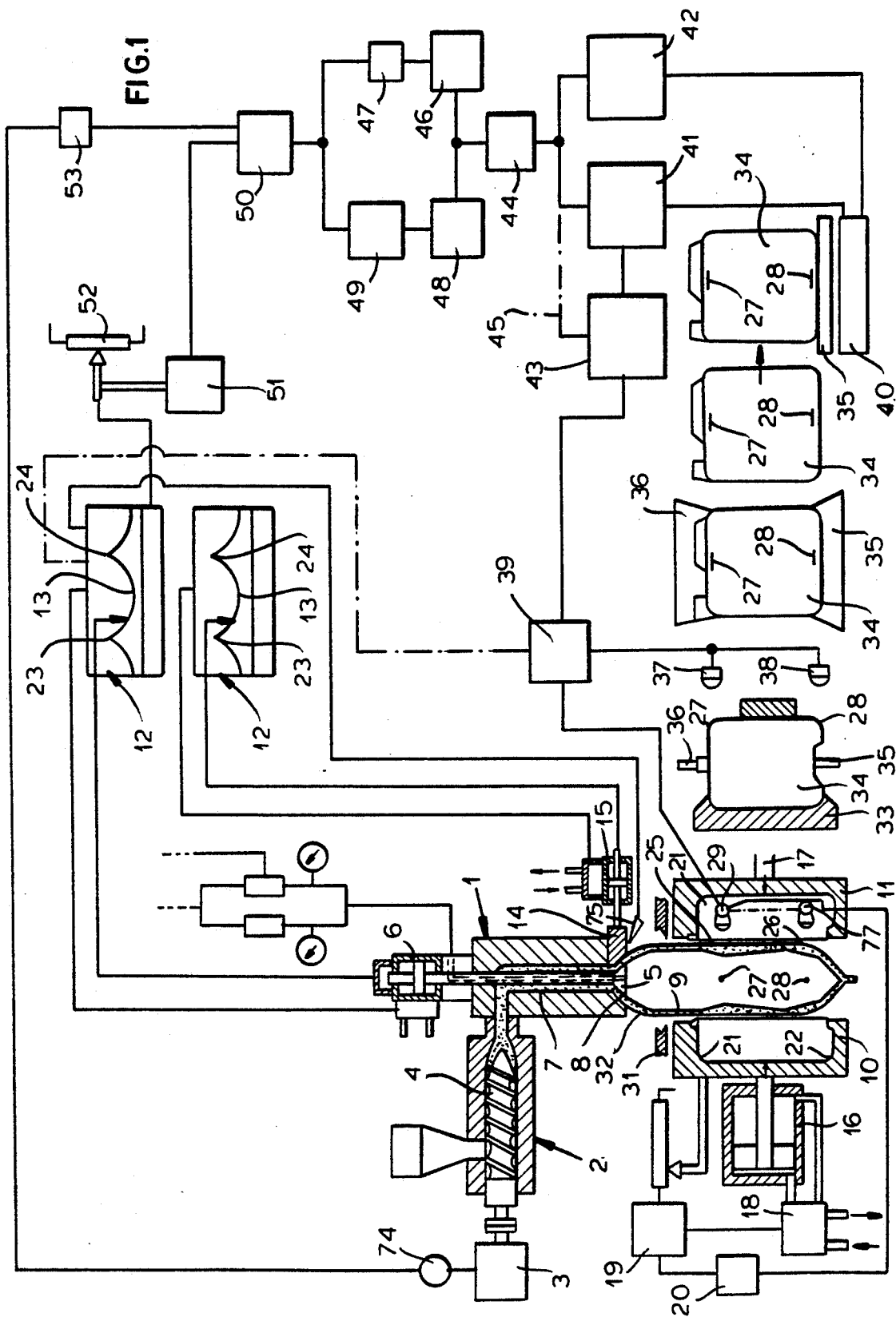
FIG. 1 is a schematic view, and illustrates the entire plant with a continuously operating extruder head including an associated regulating and control device.

FIG. 1 is an overall schematic view of a plant with a continuously operating extruder head 1 to the upper end of which is connected an extruder 2 with a screw 4 driven by a motor 3. A vertically displaceable and height-adjustable mandrel 5 is mounted inside the extruder head 1. Its adjustment is implemented by a device 6 at the upper end face of the extruder head, for example a hydraulic system. A cylindrical space 7 is present between the extruder head 1 and the mandrel 5 and is filled from the extruder 2 with a thermoplastic material which in the cylindrical space 7 will be molded into tubular form. The cylindrical space 7 at its lower end opens into a die slit 8 from which a preformed item 9 issues and arrives in the region of a blow mold 10, 11 located below and being defined by blow mold parts or halves 10 and 11. The mandrel 5 is height-adjusted by a microprocessor-controlled programming system 12 in relation to a program curve 13 (FIGS. 1 and 2) so that the cross-section of the die slit 8 shall be larger or smaller and accordingly so that the wall thickness of the preformed item 9 shall be increased or decreased. The partial control of the wall thickness may be carried out by a system 14 shown in simplified manner and driven by an adjustment means 15, whereby also the wall thickness may be varied along the periphery of the preformed item 9, and also controlled by the programming system 12 though with a different program curve.

The two blow mold halves 10 and 11 are actuated by a pneumatic or hydraulic system 16. FIG. 1 only shows the left-hand actuation system, however, the right-hand blow mold 11 also is equipped with a corresponding actuator through an attachment 17. The actuators are connected to a control system comprehensively described below, namely directly with a servo-valve 18, a comparison and regulating means 19, and a timing member 20.

The present embodiment of the invention concerns the manufacture of cans or bottles having an especially critical zone located at the can shoulder corresponding to the site 21 (FIG. 1) of the can and on at least part of the periphery relating to this site. Another critical zone is at the bottom edge of the hollow body corresponding to site 22 in the blow mold, again as seen at least over part of the periphery. In this embodiment the program curve 13 comprises two steep peaks 23 and 24 which, however, are automatically rounded off by interpolating the program curve 13. In relation to those peaks the preformed item is endowed with especially thick walls in two zones 25 and 26.

Figure 3:
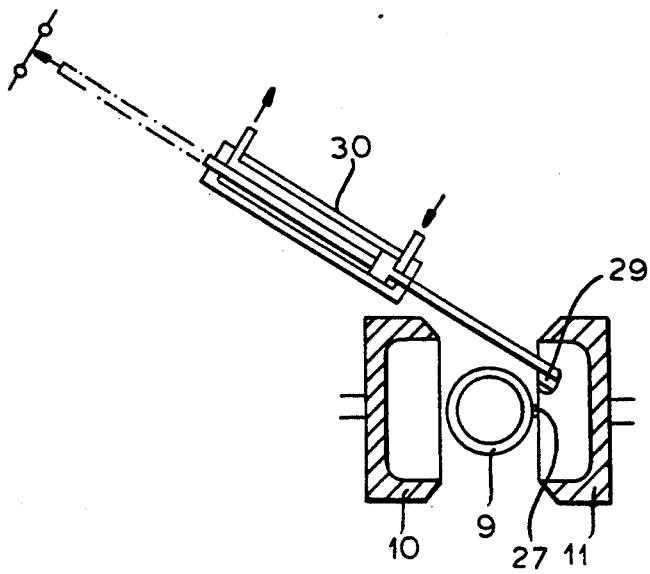
FIG. 3 is a horizontal cross-sectional view of a construction detail of FIGS. 1 and 2.

In association with those two critical zones, two markings 27 and 28 are advantageously provided externally on the preformed item by a marking system 75 and are illustratively used by the operating personnel to check the position of the critical points. If the position should be outside tolerance while the weight check proves satisfactory, a new, lower slug reference weight will be set. Again, such markings may be sensed prior to closing the blow mold 10, 11 by a pickup 29 or 77. As shown in FIG. 3, the pickup 29 or 77 may be moved into the blow mold by a telescoping pneumatic or hydraulic system 30 and be withdrawn before the blow mold is closed. As shown in FIG. 1, the markings 27, 28 may be provided externally near the blow mold dividing or parting plane and/or may be offset by 90°, as shown in FIG. 3, in a plane that is normal to the dividing or parting plane. This depends on the shape of the hollow body and/or of the blow mold.

After the blow mold has been closed, the preformed item 9 is separated by a separating device 31 from the following tube 32. Directly thereafter the blow mold is moved into a blowing station where conventional blow means inflates the preformed item 9 and expands it to the wall of the blow mold 10, 11. Once the blow mold 10, 11 has been reopened, the blown hollow body 34 is removed in a mask 33 to the outside. In that state the hollow body 34 comprises a lower waste-portion or waste slug 35 and an upper waste portion or waste slug 36 produced during the pinch-off at the closing of the blow mold 10, 11. Advantageously and possibly following a 90° rotation about a vertical axis, the hollow body 34 is associated with pickups 37 and 38 which accurately sense whether the markings 27 and 28 are at the correct positions or whether and to what extent deviations are present. The measured values from the pickups 37, 38 and 29 are fed to a comparison and control means 39 of the control system.

The lower waste portion 35 and the upper waste portion 36 are now separated from the hollow body 34. Thereupon the lower waste portion 35 is appropriately laid flat on a weighing scale 40 where its weight is measured. Individually selected lower waste portion 35 may be manually deposited on the scale. However it is more appropriate to move all the lower waste portions sequentially and fully automatically on the scale. In addition or alternatively the net weight of the hollow body 34 also may be measured with the lower waste portion 35. For that purpose there may be present a second scale so that the first one may be used exclusively to determine the weights of the lower waste portion 35 and the second scale to determine the net weights of the hollow bodies 34. The weights of the lower waste portion 35 are fed to a control means or member 41 of the control system, whereas the net weights of the hollow bodies 34 are fed to another control means or member 42. The comparison and control means 39 feeds the measured values regarding the markings 27, 28 to a spacing means or member 43 essentially evaluating the distance y2-y1 which shall be discussed further hereinafter. The means or members 41 through 43 are connected to an adder means or stage 44 which is operative, however, only when the compared weight consists of several individual weights. Ordinarily the spacing means or member 43 is connected to the control means or member 41. However, as indicated by the dot-dash line 45, it may bypass the control means or member 41 and be directly connected to the adder means or stage 44.

Beyond the addition stage, the control system divides into two branches. During start-up of the extruder head, the right branch becomes operative by means of a setting means or member 46 and a timing means or member 47 whereby, during the start-up stage, any weight differences are immediately compensated and switching to the operational phase can take place after a time preset by the timing means or member 47. But it is possible to switch over to the operational phase by means of other criteria, for instance, if the deviations from the reference value grow to a predetermined magnitude. After the start-up stage, the production member 48 becomes operative by means of the subsequent tendency stage or means 49 of the other branch. Any correction values for the die slit 8 are fed from a comparison and control means or stage 50 (FIG. 4), to be described further hereinafter, to an adjusting motor 51 driving a potentiometer 52, whereby, without being required to act on the program system proper 12, the mandrel 5 and hence the die slit 8 can be adjusted. If the comparison and control stage 50 determines a correction of the screw speed ns, then the blocking means or stage 53 shall be opened and the angular speed shall be changed by the adjusting motor 74. Obviously, the ease of using the marking device 75 may be entirely foregone and the checks on the proper point locations may be visual, or relate to pressure, cutting and wall thicknesses. Again, if a targeted wall thickness point is shifted extremely, the position may also be monitored and it is possible to make use for that purpose of the automatically obtained markings because of the extreme changes in wall thickness at the critical points. All these checks are carried out to preset a new lower stub reference weight in the control means or member 41 when in the presence of deviations while the checks show constant weight sections. The latter input may be manual or automatic.

Figure 7:
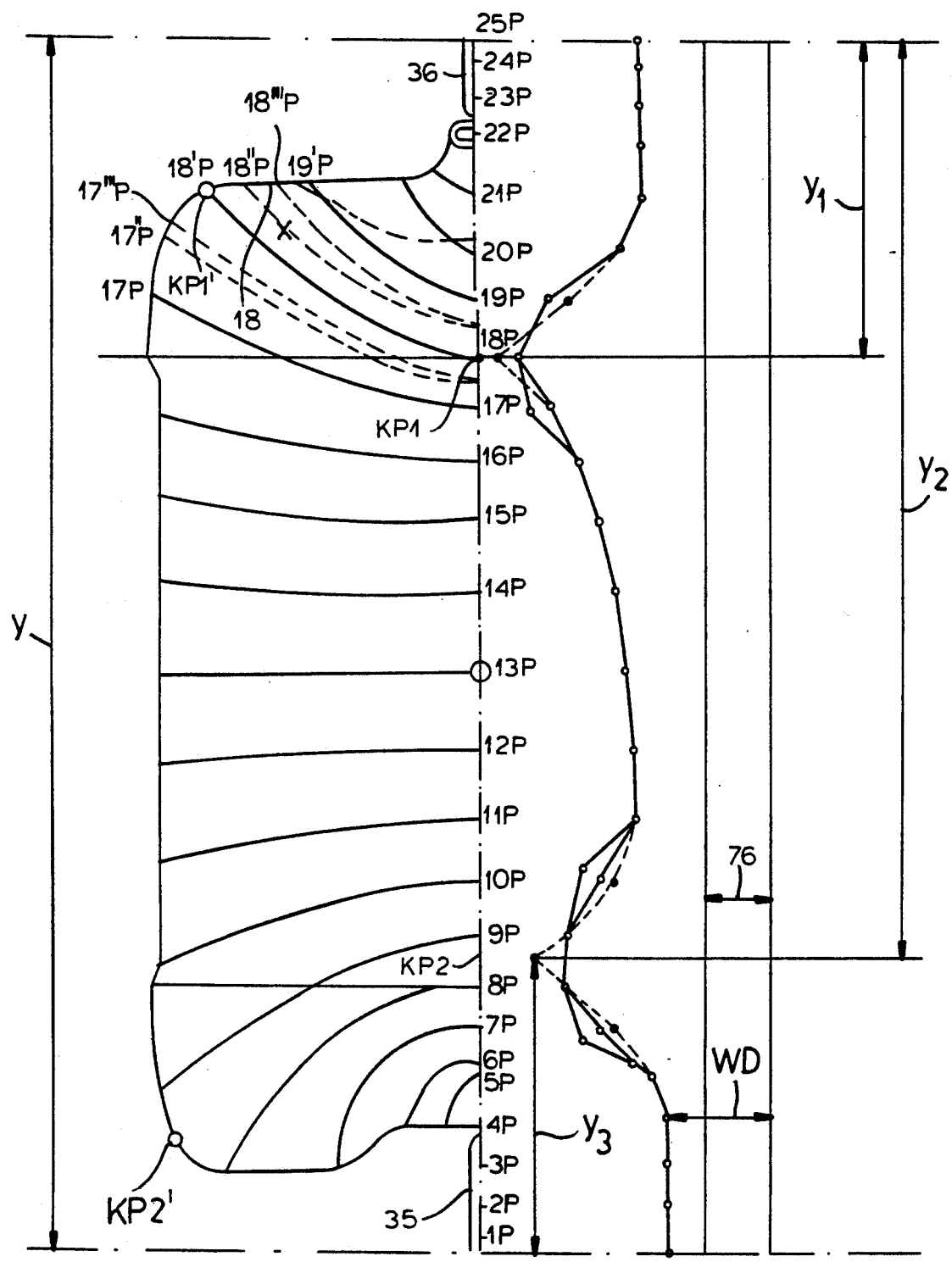
FIG. 7 is a schematic axial view, and illustrates half the contour of a can or bottle with its associated program curve.

A wall thickness programmer of the programming system 12 divides the volume of the preformed item into n-1 equal volume elements. The term n denotes the number of points of the wall thickness programmer. FIG. 7 shows the stretch lines of a preformed item of total length y when using a twenty-five point programmer with points 1P through 25P.

It is seen from the spacings between the points 17P and 18P in the mold parting seam on one hand and the spacings of points 17'P and 18'P at an angle of 90° to the mold parting line that by stretching this corner with a radius this spacing can be more than doubled. If following stretching at the critical point KP1 and at KP1' the to wall thickness shall be the same, the preformed item would have to evidence a wall thickness at the point 18'P at least twice that at point 18P. This difference would be set by the radial wall thickness. Moreover, the wall thickness at point 18'P would have to be still higher than at points 17'P and 19'P in order to achieve optimal strain values. This requires even more extreme adjustment. If there were a half point displacement toward the wall thickness point 19'P because of a displacement of the wall thickness program toward the blow mold, the following would ensue: the extreme thickening at the wall thickness point 18'P on account of that displacement shifts by half a space between two wall thickness points and stretches additionally by means of stiffness from point 18'''P by the distance x 18 toward the point 19'P as far as the point 18'''P. The wall thickness point 17'P does indeed shift by the same half space between two wall thickness points toward the wall thickness point 18'P as far as the point 17''P and because of the additional stretching farther yet to point 17'''P. But in this area the material was stretched only slightly. As a result, a longer stretch between points 17'''P and 18'''P will result as would have for the points 17'P and 18'P, respectively. This causes substantial reduction in the wall thickness at the critical point KP1' because a larger extent was stretched with the same preformed item thickness. If the many interfering factors applied to a preformed item at optimal strain values and least warping, it is clear that first of all the position of the most critical wall thickness point, in this instance the point KP1', must be moved in that position relative to the blow mold which offers the best compromise regarding the further critical points such as KP2'. The most advantageous compromise will now be illustrated in an example. If it is found that the point KP1' is at the right place, whereas the lower critical point KP2' is displaced upward or downward, the net weight remaining constant, a step must be taken to move both critical points close to the optimal positions. It may be advantageous in this respect to select a certain middle ground for both critical points, i.e., to allow both points to come somewhat closer together or move somewhat further apart.

Figure 8:
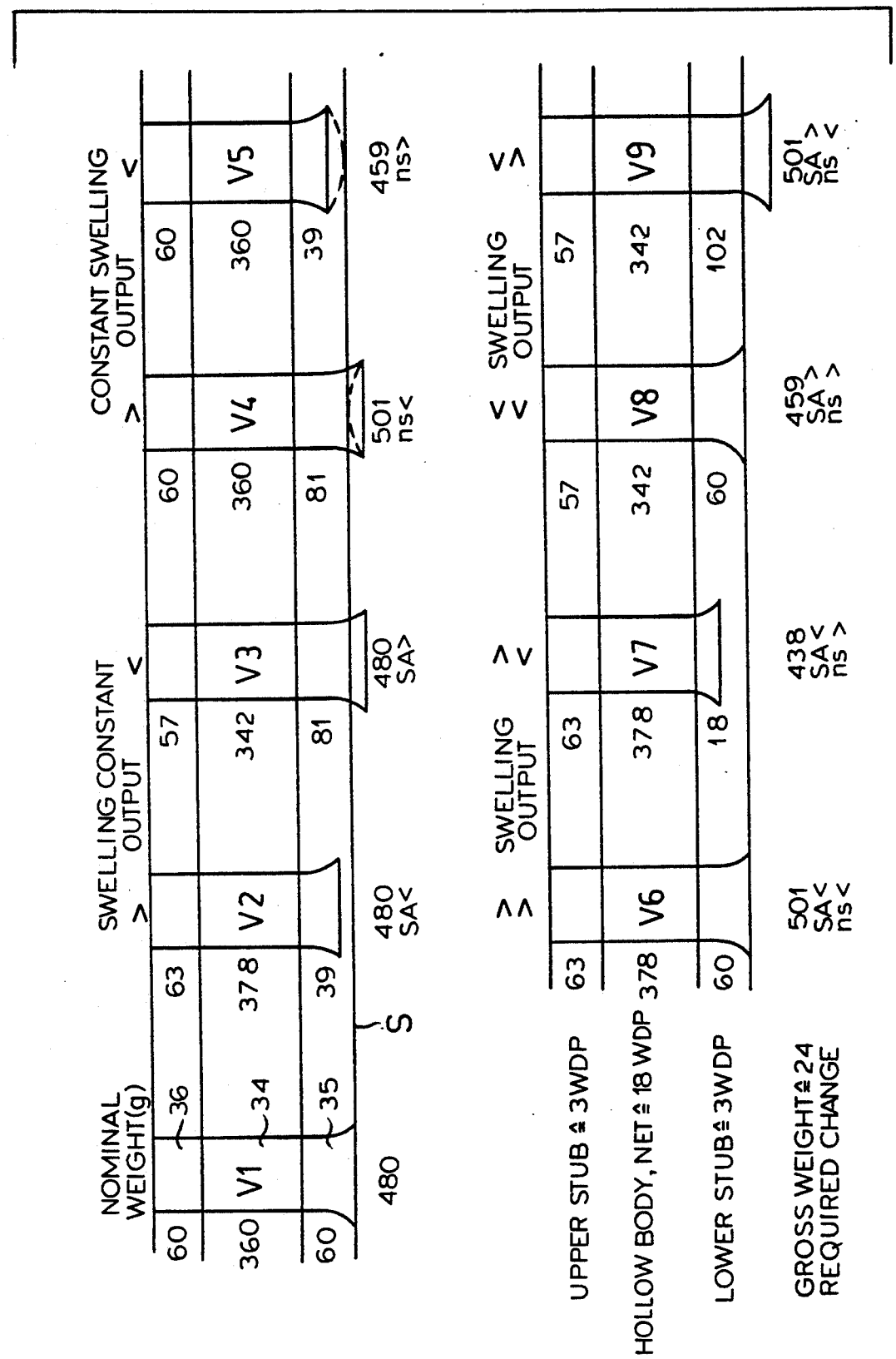
FIG. 8 are schematic views of preforms or hollow bodies.

FIG. 8 shows the effect of perturbation on the position of the preformed item in the blow mold and the weights of the lower waste portion 35, of the hollow body 34 and of the upper waste portion 36. Perturbations are fluctuating outputs and changes relating to the swelling. The preformed item V1 assumes the nominal position S inside the blow mold. The segments of the preformed item V1 associated with the waste portion 35, 36 and the hollow body 34 also evince nominal weights. The further preformed items V2 through V9 illustrate different deviations because of changes in output and/or swelling. Changes regarding swelling at constant output result in displacing the preformed item from its nominal position and in deviations of the measured weights of the segments 34, 35, 36 from the associated nominal weights (see V2, V3). At constant swelling, output fluctuations cause lower waste portion weights to deviate from their nominal weights. Changes in both swelling and output occurred in the preformed items V6 through V9. It follows from the illustrations in FIG. 8 that the actual weights differ from the nominal ones, deviation from the nominal position S also being possible but not inevitable. In order to correct the described perturbations, the die slot SA and/or the screw angular speed ns will be changed. FIG. 8 shows the required correction in qualitative manner. As regards V2 and V3, the die slot must be changed, and as regards V4 and V5, the screw angular speed must be changed. As regards V6 through V9, changes both in the die slot and in the screw angular speed are required. In summary, FIG. 8 shows that a single measurement of the net weight cannot lead to determining the position of the preformed item and of the hollow body relative to the blow mold.

Unequivocal position control however is possible in continuous operation if two measurement values are being used.

Figure 4:
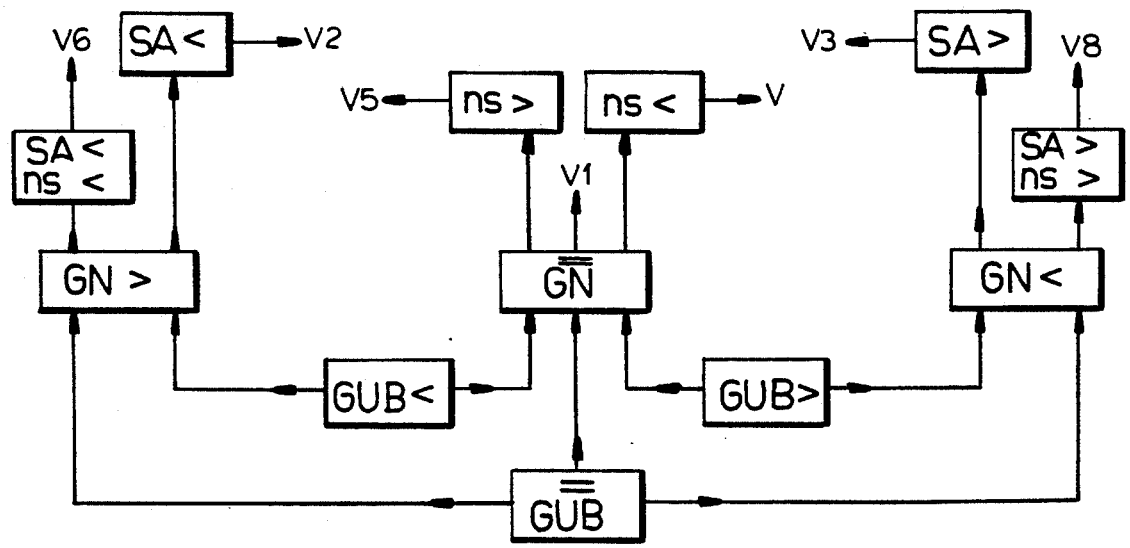
FIGS. 4 through 6 are flow diagrams, and illustrate regulation or control steps for performing selective molding operations.
Figure 9:
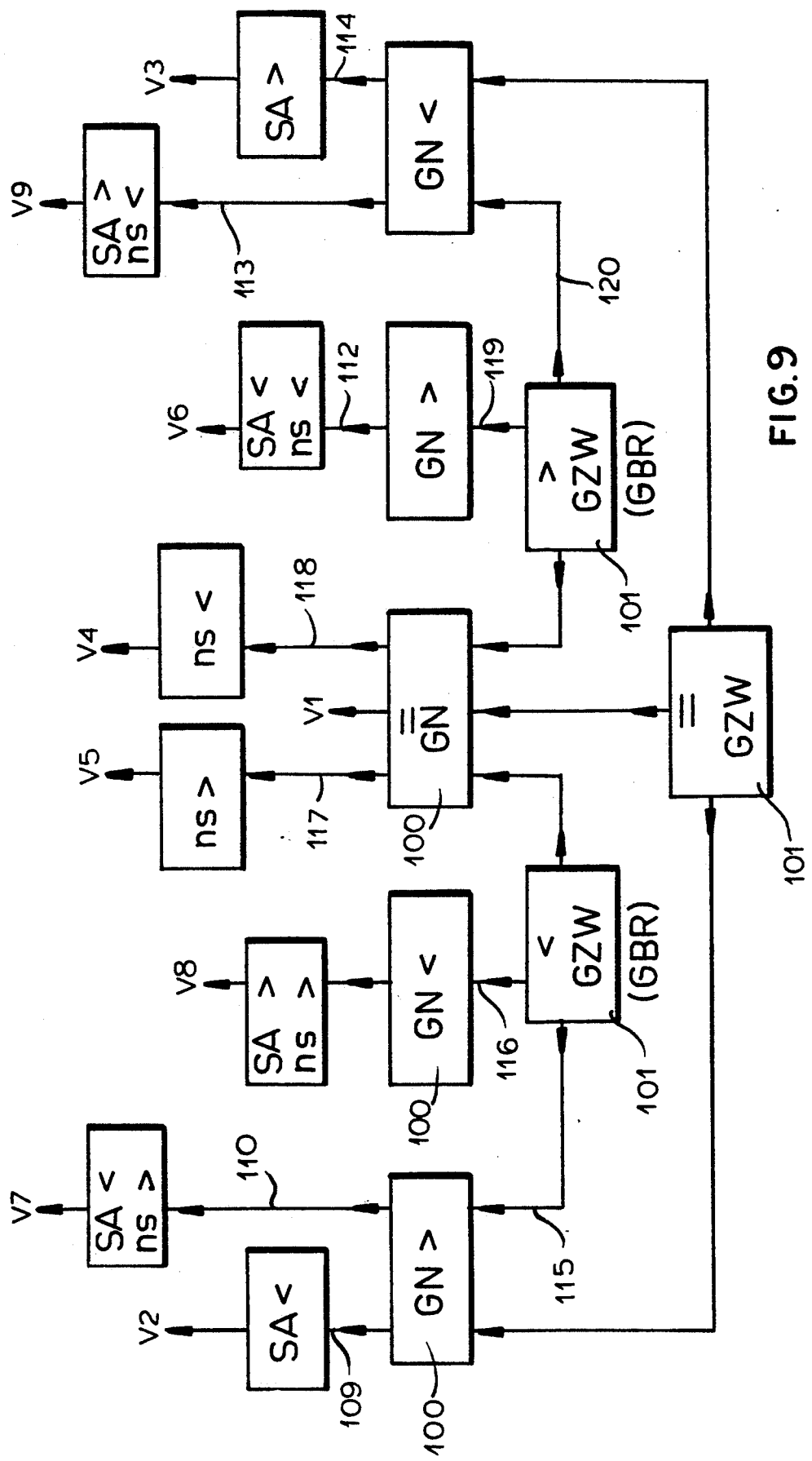
FIG. 9 is a flow diagram, and illustrates regulating and control steps for performing selective molding operations.

FIGS. 4 and 9 show block circuits of control methods or steps used for the comparison and control stage 50 of FIG. 1. Therein,

| | |
|---|---|
| GUB | weight of the lower waste portion |
| GN | net weight of the hollow body |
| GZW | sum of lower waste portion weight and net weight |
| GBR | gross weight of the blown body. |

As regards the control method shown in FIG. 4, the net weight GN of the hollow body and the weight GUB of the lower waste portion are measured and are compared with the associated nominal values and in accordance with the control errors shown in the measurement blocks 100, 101, the set points SA and ns are then changed in a manner elucidated below to properly cancel the errors of the preformed items V2 through V9 toward the desired preformed item V1. The preformed item V1 will be set when the weights GN and GUB correspond to the nominal values (path 102). If the net weight GN of the hollow body deviates from the associated hollow body nominal weight (GN> or GN<), the die slot SA is adjusted in correcting m manner in such a way that the net weight of an ensuing hollow body shall correspond to the hollow body nominal weight (paths 103, 104, 105, 106). The additionally measured weight GUB of the lower waste portion is compared with a reference value and the screw angular speed ns is adjusted in order to balance the actual and reference values of an ensuing blown body (paths 107, 108). If now the setpoint should turn out to be only one value, then it will be possible to quickly cancel the error. If on the other hand both ns and SA must be changed, the error cancellation will take somewhat longer. Moreover FIG. 4 shows the following features: If in practice and because of a change in plastic material the extruder output and simultaneously the swelling behavior are altered (V6, V8), then the comparison will not provide unequivocal correction steps. As regards the method shown in FIG. 4, the die slot correction SA is given control priority over the screw angular speed ns. Thus, first there is die slot correction to balance a deviation in hollow body net weight as a function of the deviation in weight of the waste portion from its reference weight. The blocking stage 53 shown in FIG. 1 is provided for that purpose, whereby the screw angular speed can only be changed after the correction of the die slot SA has been completed. The invention moreover covers the adjustment of the die slot SA in larger increments than the screw angular speed ns when correction of SA and ns is required in the same direction, for instance toward smaller values.

In the embodiment of the control method of the invention shown in FIG. 9, a measurement is taken of the net weight GN of the hollow body and additionally of the total weight GBR of the blown body or the summed weight GZW of hollow body weight GN plus weight GUB of the lower waste portion. The net weight GN of the hollow body is compared with a nominal hollow body weight and if the net weight deviates (GN< or GN>)from the nominal hollow body weight, the die slot SA is then corrected in such a way that the net weight of an ensuing hollow body shall correspond to the nominal hollow body weight (paths 109 through 114). The weight values GZW or GBR are compared with a reference value and in the light of the comparison of actual and reference values, the screw angular speed ns is adjusted accordingly (paths 115 through 120). If for instance at the bottom and center of FIG. 9 the sum GZW of the individual weights and of the net weight GN are equal to the compared nominal values a preformed item V1 shall be obtained and no changes need be introduced. If GZW agrees according to the left path whereas the net weight GN is excessive, then in the absence of control the preformed item V2 would be obtained. Once error cancellation has been achieved by changing the width of the die slot SA to make it smaller, the preformed item V1 again is obtained. The schematic of FIG. 9 must be construed in this sense, namely, in the direction of the particular arrows shown. If for instance the sum GZW of the individual weights is too small or too large, as for the preformed item V7 or V9, then in the case of excessive net weight GN or deficient net weight, the setpoints must be changed in the sense of the arrows shown, so that in each case the preformed item V1 shall again be obtained. The schematic of FIG. 9 must be construed in this way for all the arrows shown. The great advantage of the control method shown in FIG. 9 is that once knowing the net weight GN and the summed weight GZW or the gross weight GBR, unequivocal control magnitudes can be generated which allow keeping constant both the net weight of the hollow body and also its critical points and even to cancel in parallel the errors in a control unit. To accelerate the error cancellation, this adjustment is carried out simultaneously when changing the setpoints SA and ns in opposite directions (see paths 110, 115 and 113, 120 relating to V7 and V9).

Figure 6:
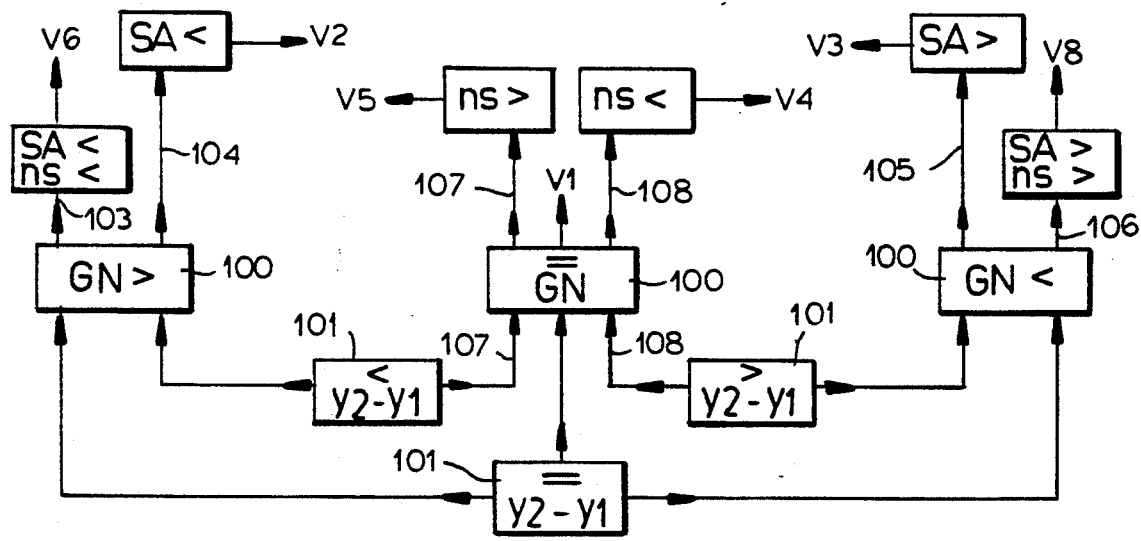

In the embodiment of the disclosure of the invention shown in FIG. 6 the net weight GN of the hollow body and the spacing differential y2 - y1 as the second measurement value are used. The spacing differential y2 - y1 denotes the spacing between two monitored points, especially points associated with the functional maximum values of the wall thickness program. The spacing between the monitored points can be measured at the preformed item and/or the blown body. The net weight GN of the hollow body is compared with a nominal hollow body weight and in case of deviation of the net weight from the hollow body nominal weight, as shown in the measurement block 100, the die slot SA is displaced for correction in such manner that the net weight of a subsequent hollow body shall correspond to the hollow body nominal weight. The spacing y2 - y1 between two monitoring points is measured additionally and the second measurement value is compared with a reference value. The comparison value is shown in the measurement value blocks 101. The screw angular speed ns is adjusted in a correcting manner to balance the actual and reference values for a subsequent blown body. The already described measuring systems 29, 77 and/or 37/38 may be used to measure the spacing. However, the wall thickness of the hollow body also may be measured in the blowing mold, preferably by an ultrasonic pickup. When controlling the spacing jointly with the control of the hollow body net weight, advantageously the spacing control shall have priority in control.

Figure 2:
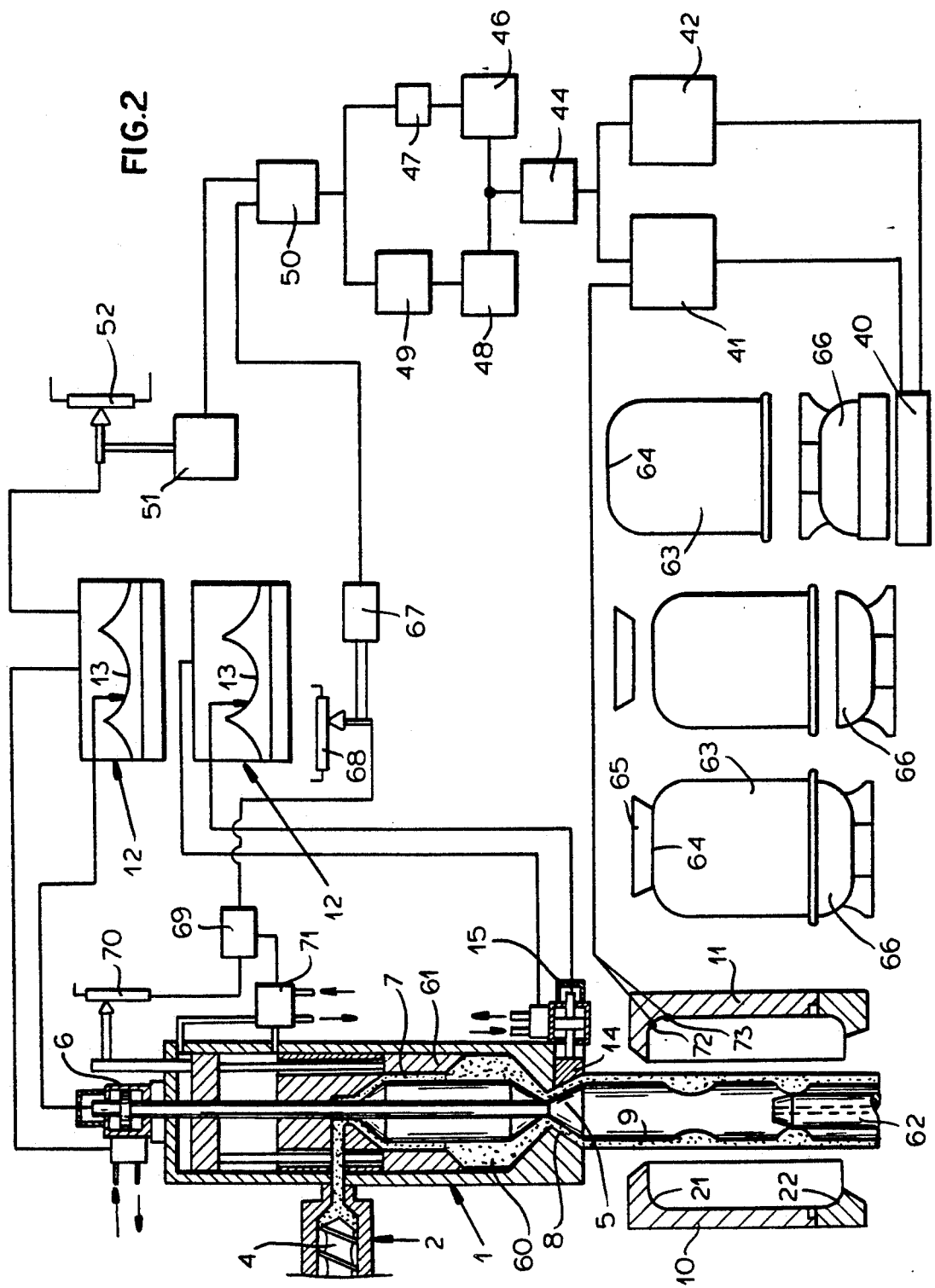
FIG. 2 is a schematic view, and illustrates another overall plant of different design with an extruder head comprising an accumulator head.

FIG. 2 shows another embodiment of equipment of the invention. The same reference numerals are used for the same or equivalent components as in FIG. 1. However, in this case the extrusion head 1 is designed as an accumulator head with a storage space 60 and a vertically displaceable hollow plunger 61. A feed pipe 62 for the blown air is shown schematically in the lower region of the blow mold. In this embodiment the hollow bodies are containers open on one side which were preformed with the bottom 64 up, whereby the upper waste portion 65 is severed from the container bottom. The lower waste portion 66 also is severed and is sometimes professionally called a "dome." This lower waste portion or dome 66 is fed to the scale 40, as was described. The comparison and control means or stage 50 is connected to an adjustment motor 67 and a potentiometer 68 which in turn is connected to a comparison and control means or member 69, to another potentiometer 70 and a servo-valve 71 to control the hollow plunger 61.

Figure 5:
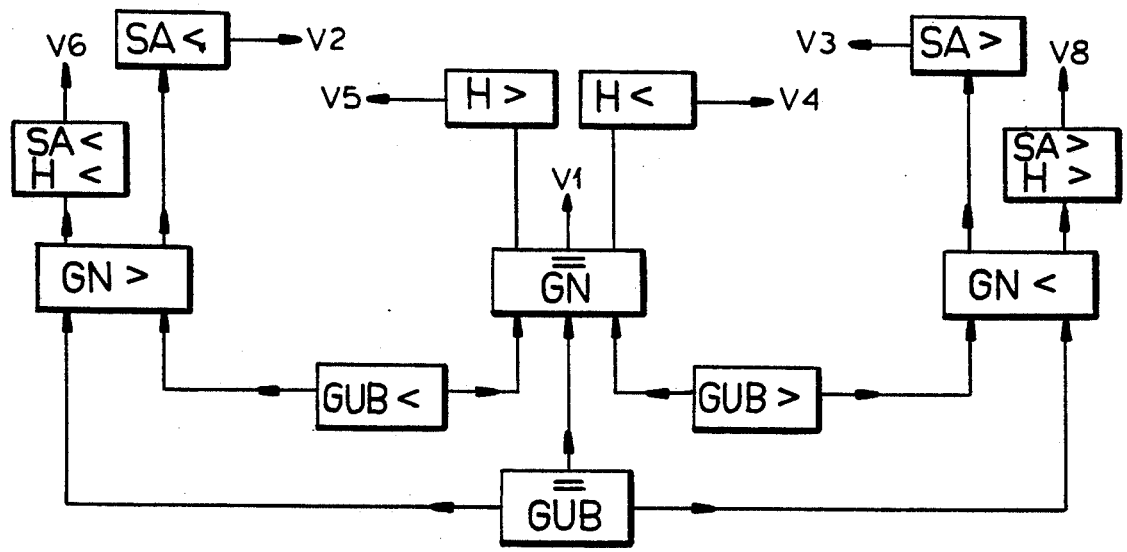

FIG. 5 shows the control method utilizing operation of the comparison and control stage 50 for the equipment of FIG. 2. The net weight of the hollow body and additionally the weight of the lower waste portion are measured. The measured values are compared with a hollow body nominal weight and with a further reference weight, and the die slot SA, as well as the storage stroke H of the hollow plunger, are adjusted in a correcting manner in relation to the control errors shown in the measurement value blocks 100, 101 in such manner that for a subsequent hollow body, the hollow body net weight and the weight of the lower waste portion shall correspond to the associated reference value. For constant storage stroke, for constant density of the plastic, and for constant expulsion time, a constant gross weight of hollow body also shall be expelled, as a rule it will be enough only to keep the lower waste portion weight or the net weight. This is implemented by controlling the die slot 8. Controlling by means of the net weight is preferred if, for instance, pre-extrusion must take place. Pre-extrusion shall be the case when the die slot has not been sufficiently closed and hence plastic shall exit from the die slot during storage filling before the actual preformed item is expelled.

If the density or the expulsion time of the conveyed material changes because of a different temperature, a different pressure or different plastic data/characteristics, such a change shall be recognized, at constant lower waste portion weight, by the comparison with the net weight of the hollow body 63 and the control error then shall be cancelled by means of the accumulation stroke. For that purpose the comparison and control stage 50 is connected to a stepping motor 67 and a potentiometer 68 which in turn is connected to a comparison and control means or member 69, to a further potentiometer 70 and a servovalve 71, whereby in this case the hollow plunger 61 shall be controlled as a function of the changes in the net weight. Moreover it is possible also to program the changes in density as a function of the values of material, of temperature and pressure into the comparison and control stage 50. Again, the above described approaches can be used to monitor the position of the critical points. A further automatic monitoring capability is offered advantageously by the wall thickness measurement 72, 73 of the hollow body in the blow mold 11. Preferably ultrasonic pickups shall be used for the latter measurements.

At a constant storage stroke the same specific weight of the plastic and the same output rate, a constant gross weight of the hollow body will be produced, and therefore most of the time it suffices to keep constant only the lower waste portion weight or the net weight. This is achieved by controlling the die slit 8. Regulation by means of the net weight shall be preferred when, for instance, production employs pre-extrusion. Pre-extrusion shall be the case when the die slit is inadequately closed and therefore plastic already exits from the die slit during the accumulator filling procedure before the preformed item itself has been expelled.

If now the specific weight or the ejection rate of the conveyed material varies because of different material temperatures or plastic characteristics/data, then such a change shall be noted for constant lower waste portion weight by comparison with the net weight of the hollow body 63 and shall be compensated for by means of the storage stroke. For that purpose the comparison and control stage 50 is connected to an adjusting motor 67 and a potentiometer 686 in turn connected to a comparison and control means or member 69, to a further potentiometer 70 and a servovalve 71, whereby in this case the net weight of the hollow plungers 61 is regulated as a measure of the changes in net weights. It is furthermore possible to program the changes of the specific weight as a function of the material, temperature and pressure values into the comparison and control means or unit 50. To monitor the position of the critical points it is again possible to resort to the approaches already described. Advantageously a wall thickness measurement 72, 73 of the hollow body in the blow mold 11 may be used as a further automatic check. Preferably ultrasonic pickups shall be used for this purpose.

Present day wall thickness programming means divide the preformed item volume into n-1 equal volume segments. Here n denotes the number of the program points. As shown by FIG. 7, twenty four volume segments result, which to a first approximation mean twenty four equal weight sections. The following point spacings and weight proportions ensue:

$y = 24$
$y1 = 6.5$
$y2 - y1 = 9.5$
$GUB = 3$
$GOB = 3$
$GN = 18$
$GZW = GUB + GN = 21$
$GBR = 24$.

The above means that to a first approximation the y-paths correspond to the stated point spacings. The weight proportions also are referred to in FIG. 7 to these stated point spacings. As long as the weight proportion of the lower waste portion 35 remains constant, the weight sections between the associated points also are constant, that is relative to the points associated with y1 and y2. Then the hollow body weight and that of the upper waste portion also are constant. Advantageously the weight of the lower stub or the sum of the individual weights, GZW, shall be controlled to a constant value in any operational state that might vary from case to case, in other words, in the instance of automatic position control of the critical points, a new reference weight for the lower waste portion or for the GZW may be determined automatically for every altered operational state.

The variable wall thickness is denoted by the arrow WD and consists of the program curve and the base slit 76. The base slit 76 and/or the factor multiplying the program curve can be used to change the die slit. If specific measurements of wall thickness take place, the results may be used to decide on changing either the base slit or multiplying the program factor.

FIG. 7 furthermore illustrates the dashed-line peaks of the program curve relative to the critical points KP1 and KP2 which can be made to materialize by means of the invention and be moved into the proper position relative to the blow mold, whereas in practice all of the state of the art can only move over the associated, flattened program curves shown in solid lines.

It is emphasized here that one of the essential advantages of the invention is the ability of using just one apparatus to keep constant both the hollow body net weight and the position of the critical cross-sectional zones relative to the blow mold.

A pickup was earlier described relative to FIG. 3 which can be moved into and withdrawn from the blow mold. Instead an advantageous embodiment of the invention may be used wherein this pickup is stationary inside the blow mold. Moreover, this system may be so designed that the pickup shall be height-adjustable for the purpose of keeping constant the time interval between sensing the particular marking and the fixation of the preformed item in the blow mold. As a result, the marking shall coincide with the critical cross-sectional zone.

The invention furthermore applies if in another (omitted) extrusion blow molding plant first the entire blown body is moved toward a weighing scale to determine the gross weight GBR with the waste portions being removed only thereafter. This gross weight illustratively may be used in the comparison and control stage 50 (FIG. 1) in lieu of the sum of the individual weights, GZW, and would allow regulating the storage stroke in accumulator head operation and the screw angular speed in continuous extrusion. This system also would offer the advantage to carry out the proper alteration without previous comparison with a second magnitude. The waste portions will then be removed in a subsequent station. As shown by FIG. 8 relative to the preformed items V2 and V3, both the net weight and the lower waste portions may be used as the second setpoint. Advantageously the net weight shall be used and in case of deviations the die slit SA shall be changed.

The gross weight GBR is used with the checks on the proper position of the critical points. This means that in the course of the automatic spacing check, a new gross weight reference GBR shall be fed into the spacing means or member 43 in lieu of a new lower stub weight GUB.

Without thereby transcending the scope of the invention, a further advantageous step may be to so regulate and/or control or set the position of the particular preformed item relative to the blow mold as a function of at least one predetermined cross-sectional zone of the preformed item, preferably a critical zone, that the length of the preformed item up to the predetermined cross-sectional zone is compared with the preset program in a wall thickness program system, and in that the part of the preformed item yet to be ejected will be so dimensioned or changed that the cross-sectional zone moves into the right position relative to the blow mold. The setting of any second critical point would take place at constant values as show in FIGS. 6 and 7. Besides the steps already described, this is achieved as follows: the wall thickness program y may be expanded or shortened and the required length of the preformed item may be obtained by changing the spacings of y3 and/or y1 in such a manner that the spacings y2 - y1 or KP2' and KP1' are kept constant. When the spacing is regulated jointly with a regulation of the net weight of the hollow body, the spacing control advantageously shall have priority.

As already mentioned above, an important aspect of the insight of the invention will now be emphasized. Position control by means of the lower waste portion weight or by means of the sum of the individual weights is substantially more accurate than by means of the lower edge of the preformed items. In view of the interfering factors and the defects which may result from them, the position of the critical points may have to be corrected upon being sensed. If only one critical point is involved, the position control with simultaneous regulation of the hollow body net weight shall relate only to that point. But if two or more critical points are present, the most advantageous positional mean of all critical points must be ascertained. This adjustment can be carried out by setting a new reference weight for the lower waste portion or for the sum of the individual weights, or the gross weight of the blown body manually. Advantageously, a new reference value shall be preset by a system measuring the actual value on the basis of the position check. In order to be able to forego comparison with a further weight value, the above described spacing control and/or regulation can be used at the preformed item and/or at the hollow body with simultaneous net weight regulation of the hollow body.

An advantageous embodiment of the invention is achieved by providing a row of horizontal photocells or a horizontal light strip to sense the position of the preformed item and in that an average is formed of the points of different heights. Such a light strip or row of photocells may illustratively be used to sense any edges, projections, markings and the like anywhere over the height of the preformed item or of the ejected blown body. This is important when such sites to be sensed are substantial in the horizontal direction while deviating more or less from the exact horizontal, i.e., when they are offset in height in some way.

The invention shall always be applicable when at least one weight of the ejected blown body is determined by a comparison between actual and reference values and when following the position check of at least one critical point the positioning unit carries out an automatic adjustment of the setpoint.

Although a preferred embodiment of the invention has been specifically illustrated and described herein, it is to be understood that minor variations may be made in the apparatus and the method without departing from the spirit and scope of the invention, as defined in the appended claims.

I claim:

1. A method of extrusion blow-molding hollow thermoplastic bodies comprising the steps of:
   a) feeding thermoplastic material by a variable angular speed screw extruder to a continuously operating extrusion head having a variable die slit,
   b) extruding a tubular blank through the variable die slit of the extrusion head and varying the die slit in relation to a wall thickness program including at least one maximum wall thickness value associated with a critical cross-section of a desired hollow body,
   c) expanding the tubular blank in a blow mold into a first blown body,
   d) ejecting the first blown body from the blow mold and dividing the first blown body into a hollow body, a upper waste slug and a lower waste slug,
   e) measuring the net weight of the hollow body and comparing the measured net weight with a desired hollow body reference weight,
   f) measuring the weight of the lower waste slug and comparing the measured weight with a desired waste slug reference weight,
   g) in the event that the measured hollow body net weight deviates from the hollow body reference weight, readjusting the variable die slit in such a manner that a subsequent blown body comprises a subsequent hollow body having a hollow body net weight which corresponds to the desired hollow body reference weight,
   h) in the event that the measured weight of the lower waste slug deviates from the waste slug reference weight and besides that the measured net weight of the hollow body corresponds to the hollow body reference weight, readjusting weight, readjusting the angular speed of the screw extruder in such a manner that a subsequent blown body comprises a subsequent lower waste slug having a weight which corresponds to the desired waste slug reference weight,
   i) adjusting the waste slug reference weight to correct the position of yet further subsequent blown bodies within the blow mold in such a way that the critical cross-section of such further subsequent blown bodies arrives at a predetermined location in the blow mold.

2. A method of extrusion blow-molding hollow thermoplastic bodies comprising the steps of:
   a) feeding thermoplastic material by a variable angular speed screw extruder to a continuously operating extrusion head having a variable die slit,
   b) extruding a tubular blank through the variable die slit of the extrusion head and varying the die slit in relation to a wall thickness program including at least one maximum wall thickness value associated with a critical cross-section of a desired hollow body,
   c) expanding the tubular blank in a blow mold into a blown body,
   d) ejecting the blown body from the blow mold and dividing the blown body into a hollow body, an upper waste slug and a lower waste slug,
   e) measuring the net weight of the hollow body and comparing the measured net weight with a desired hollow body reference weight,
   f) measuring the weight of the lower waste slug, determining the sum-weight of the measured net weight of the hollow body and the measured weight of the lower waste slug, and comparing said sum-weight with a desired reference weight value,
   g) in the event that the measured hollow body net weight deviates from the hollow body reference weight, readjusting the variable die slit in such a manner that a subsequent blown body comprises a subsequent hollow body having a hollow body net weight which corresponds to the desired hollow body reference weight,
   h) in the event that the sum weight of step f) deviates from the desired reference weight value, readjusting the angular speed of the screw extruder in such a manner that a subsequent blown body comprises a subsequent hollow body and a subsequent lower waste slug having a sum-weight which corresponds to the desired reference weight value of step f),
   i) readjusting the die slit and the angular speed of the screw extruder simultaneously to correct both deviations of step g) and step h), j) adjusting the reference value of the weight comparison of step f) to correct the position of yet further subsequent blown bodies within the blow mold in such a way that the critical cross-section of such further subsequent blown bodies arrives at a predetermined location in the blow mold.

3. The method as defined in claim 2 including the step of computing an approximation of the total weight of said blown body from the measured weights of the lower waste slug and the hollow body, and utilizing the total weight so computed in the performance of steps f) and h).

4. A method of extrusion blow-molding hollow thermoplastic bodies comprising the steps of:
a) feeding thermoplastic material by a variable angular speed screw extruder to a continuously operating extrusion head having a variable die slit,
b) extruding a tubular blank through the die slit of the extrusion head and varying the die slit in relation to a wall thickness program including at least one maximum wall thickness value associated with a critical cross-section of a desired hollow body,
c) expanding the tubular blank in a blow mold into a first blown body,
d) ejecting the first blown body from the blow mold, and measuring the total weight of the first blown body,
e) dividing the blown body into a hollow body, an upper waste slug and a lower waste slug,
f) measuring the net weight of the hollow body and comparing said net weight with a desired hollow body reference weight, and in the event of deviation of said measured net weight from said hollow body reference weight readjusting the die slit in such a manner that a subsequent blown body comprises a subsequent hollow body having a hollow body net weight which corresponds to the desired hollow body reference weight,
g) comparing the total weight measured in step d) with a desired blown body reference weight and readjusting the annular speed of the screw extruder in such a manner that a subsequent blown body has a total weight which corresponds to the desired blown body referfence weight,
h) adjusting the desired blown body reference weight of step g) to correct the position of yet further subsequent blown bodies within the blow mold in such a way that the critical cross-section of such further subsequent blown bodies arrives at a predetermined location in the blow mold.

5. The method as defined in claim 4 including the step of simultaneously adjusting the variable die slit and the angular speed of the screw extruder.

6. The method as defined in claim 1 including the step of marking an exterior of the tubular blank in at least one critical cross-sectional zone, monitoring the marked position on the first blown body, sensing any marked position deviating from a predetermined reference position, and upon so sensing a deviation establishing a new desired waste slug reference weight in accordance with step i) to correct the position of a subsequent tubular blank within the blow mold.

7. The method as defined in claim 2 including the step of marking an exterior of the tubular blank in at least one critical cross-sectional zone, monitoring the marked position on the blown body, sensing any marked position deviating from a predetermined reference position, and upon so sensing a deviation establishing a new desired reference weight for comparison with the sum-weight in accordance with step i) to correct the position of a subsequent tubular blank within the blow mold.

8. The method as defined in claim 3 including the step of marking an exterior of the tubular blank in at least one critical cross-sectional zone, monitoring the marked position on the first blown hollow body, sensing any marked position deviating from a predetermined reference position, and upon so sensing a deviation establishing a new desired reference weight for comparison with the total weight of the blown body in accordance with step i) to correct the position of a subsequent tubular blank within the blow mold.

9. The method as defined in claim 4 including the step of marking an exterior of the tubular blank in at least one critical cross-sectional zone, monitoring the marked position on the first blown hollow body, sensing any marked position deviating from a predetermined reference position, and upon so sensing a deviation establishing a new desired blown body reference weight in accordance with step h) to correct the position of a subsequent tubular blank within the blow mold.

10. The method as defined in claim 5 including the step of marking an exterior of the tubular blank in at least one critical cross-sectional zone, monitoring the marked position on the first blown body, sensing any marked position deviating from a predetermined reference position, and upon so sensing a deviation establishing a new desired blown body reference weight in accordance with step h) to correct the position of a subsequent tubular blank within the blow mold.

11. A method of forming thermoplastic hollow bodies by extrusion blow-molding comprising the steps of:
a) feeding thermoplastic material to an extrusion head having a displaceable accumulation piston with a variable piston stroke and a variable die slit,
b) extruding a tubular blank through the die slit of the extrusion head and varying the die slit in relation to a wall thickness program which includes at least one maximum value associated with a critical cross-section of a desired hollow body,
c) expanding the tubular blank in a blow mold into a blown body,
d) ejecting the blown body from the blow mold,
e) dividing the blown body at least into a hollow body, an upper waste slug and a lower waste slug,
f) measuring the net weight of the hollow body,
g) measuring the weight of the lower waste slug,
h) comparing the measured net weight of step f) with a desired hollow body reference weight, and comparing the measured weight of step g) with a desired waste slug reference weight, and in the event of deviations readjusting both the die slit and the piston stroke in such a manner that a subsequent blown body comprises a subsequent hollow body having a hollow body net weight which corresponds to the desired hollow body reference weight and that the subsequent blow body also comprises a subsequent lower waste slug having a weight which corresponds to the desired waste slug reference weight,
i) adjusting the waste slug reference weight for the weight comparison of step h) to correct the position of yet further subsequent blown bodies within the blow mold in such a way that the critical cross-section of such further subsequent blown bodies arrives at a predetermined location in the blow mold.

12. The method as defined in claim 4 including the step of measuring wall thickness of the first blown body inside the blow mold.

13. The method as defined in claim 11 including the step of measuring wall thickness of the blown body inside the blow mold.

* * * * *